N. E. WILCOX.
VEHICLE TRUCK.
APPLICATION FILED FEB. 6, 1908.

935,874.

Patented Oct. 5, 1909.
3 SHEETS—SHEET 2.

Witnesses

Inventor
Neriah Ellis Wilcox.

By Woodward & Chandler
Attorneys

N. E. WILCOX.
VEHICLE TRUCK.
APPLICATION FILED FEB. 6, 1908.

935,874.

Patented Oct. 5, 1909.
3 SHEETS—SHEET 3.

Inventor
Neriah Ellis Wilcox.

Witnesses

By Woodward & Chandler
Attorneys

UNITED STATES PATENT OFFICE.

NERIAH ELLIS WILCOX, OF PEARCE, ARIZONA TERRITORY.

VEHICLE-TRUCK.

935,874.  Specification of Letters Patent.  Patented Oct. 5, 1909.

Application filed February 6, 1908. Serial No. 414,554.

*To all whom it may concern:*

Be it known that I, NERIAH ELLIS WILCOX, a citizen of the United States, residing at Pearce, in the county of Cochise and Territory of Arizona, have invented certain new and useful Improvements in Vehicle-Trucks, of which the following is a specification.

This invention relates to vehicle trucks, and more particularly to the running gear therefor, and has for an object to provide a running gear for trucks including rigged front and rear axles, so that the body of the truck will be fully supported at each corner when turning.

A further object of this invention is to provide means whereby the tendency of the draft tongue of the truck to beat against the sides of the draft animals is minimized.

Other objects and advantages will be apparent from the following description and it will be understood that changes in the specific structure shown and described may be made within the scope of the claim without departing from the spirit of the invention.

Figure 1:
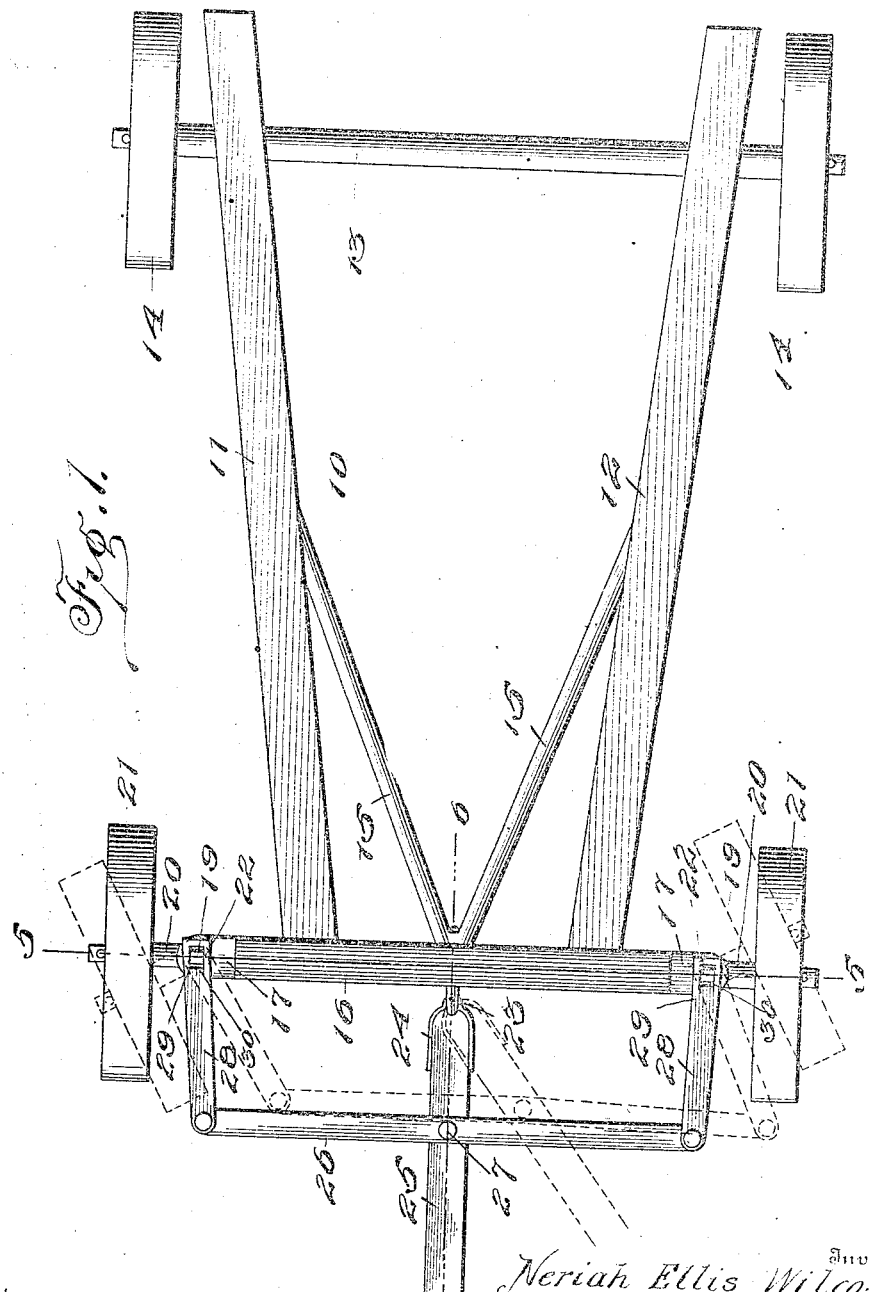
Figure 2:
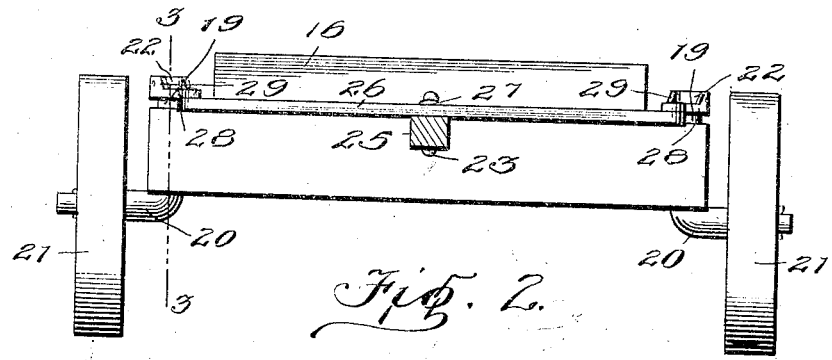
Figure 5:
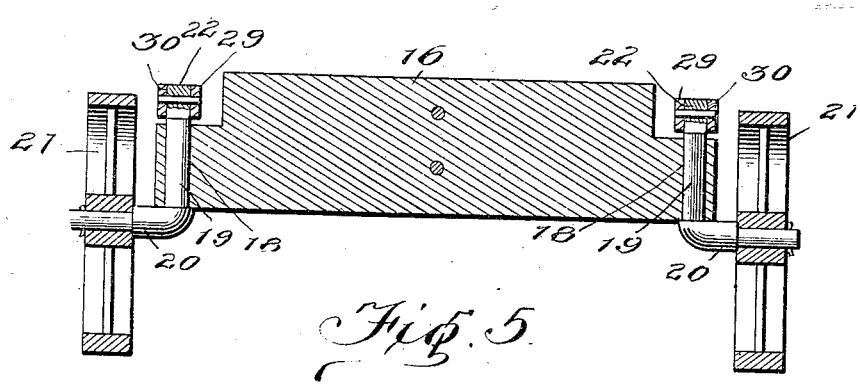
Figure 7:
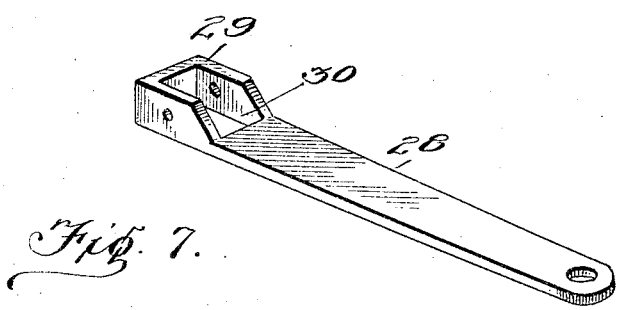
Figure 3:
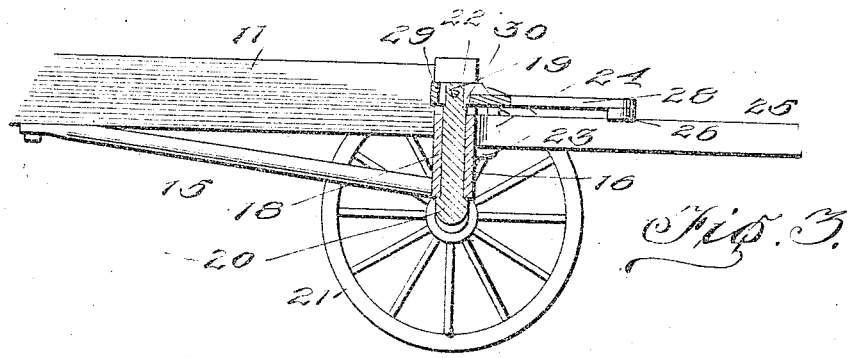
Figure 6:
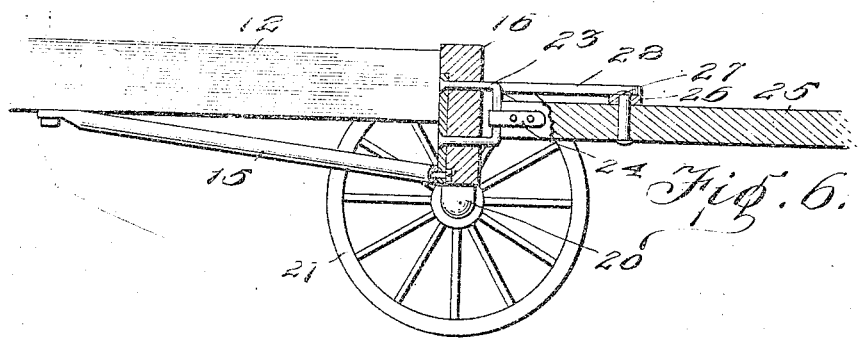
Figure 4:
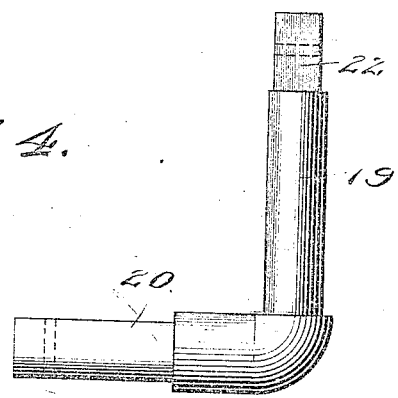

In the drawings forming a portion of this specification, and in which like numerals of reference indicate similar parts in the several views, Figure 1 is a top plan view of the present truck showing the dotted position of the front wheels during turning of the truck, Fig. 2 is a front elevational view, Fig. 3 is a vertical sectional view on the line 3—3 of Fig. 2, Fig. 4 is a detail view of one of the spindles for the front axle, Fig. 5 is a transverse sectional view on the line 5—5 of Fig. 1, Fig. 6 is a detail longitudinal sectional view on the line 6—6 of Fig. 1, Fig. 7 is a perspective view of one of the links.

Referring now more particularly to the drawings, there is shown a vehicle truck 10 comprising longitudinally extending spaced beams 11 and 12 respectively, provided adjacent their rear ends with a rear axle 13 supported upon wheels 14, as shown.

The beams 11 and 12 are provided with braces 15, secured centrally thereof and extending forwardly and inwardly to a front axle 16 fixed in parallel relation to the rear axle 13, and at the ends outwardly of the beams 11 and 12 respectively the axle 16 is cut away horizontally as shown at 17.

Adjacent the outer ends, the axle 16 is provided with vertically extending passages 18 arranged to receive vertical portions 19 of horizontally extending spindles 20. The spindles 20 are thus arranged to support ground wheels 21. The vertical portions 19 of the spindles are squared as shown at 22 for a purpose to be hereinafter described.

The axle 16 is provided with an outwardly extending staple 23 arranged to receive a metallic plate 24 carried by a draft tongue 25. The staple 23 is vertically disposed, and the draft tongue which is connected thereto is thus arranged for horizontal movement.

The draft tongue 25 is provided with a transversely extending bar 26 pivoted to the tongue as shown at 27, and adjacent each end of the bar and pivotally connected thereto there are shown links 28 having enlarged rear ends 29, and these enlarged ends of the links are provided with vertically disposed passages 30 arranged to receive the squared ends 22 of the portions 19 of the spindles.

It will be seen that upon turning of the truck the draft tongue 25 will of course be swung into a position similar to that shown in dotted lines in Fig. 1 of the drawings, and by the provision of the transversely extending bar 26 and the links 28 which are independently connected to each spindle of the forward axle, it will be seen that the wheels 21 will be turned to the desired inclination and the construction is such that the load may be equally distributed upon the truck without injury as a result of unequal strain.

What is claimed is:

In a vehicle truck the combination with spaced side members and a fixed axle engaged therewith, of a plate secured upon the rear face of the axle, diagonal brace members engaged with the axle and connected centrally of the side members, a clevis member engaged through the axle and with said plate, a horizontally pivoted tongue engaged with the clevis, the opposite end portions of said axles being cut-away on their upper sides, and provided with vertical passages, horizontal spindle members each having vertical shaft extensions respectively disposed revolubly in said passages, the upper ends of said shaft extensions being squared, a transverse bar pivoted upon the tongue in parallel relation with the axle, and steering link members engaged upon said squared portions of the spindles and secured pivotally by their outer ends to said transverse bar.

In testimony whereof I affix my signature, in presence of two witnesses.

NERIAH ELLIS WILCOX.

Witnesses:
CHARLS S. MONMONIER,
JOHN E. NEWBURY.